Jan. 5, 1960 J. W. SELLNER Re. 24,762

COMBINED SEAT AND EXERCISER

Original Filed May 20, 1954

INVENTOR:
JOHN W. SELLNER,
BY O. Martin
ATTORNEY.

United States Patent Office

Re. 24,762
Reissued Jan. 5, 1960

24,762

COMBINED SEAT AND EXERCISER

John W. Sellner, Tujunga, Calif.

Original No. 2,724,428, dated November 22, 1955, Serial No. 431,140, May 20, 1954. Application for reissue November 22, 1957, Serial No. 698,894

10 Claims. (Cl. 155—45)

Matter enclosed in heavy brackets [ ] appears in the original patent but forms no part of this reissue specification; matter printed in italics indicates the additions made by reissue.

This invention relates to adjustable seating and exercising devices and has for its object to provide a device which by simple adjustments may be placed in the most comfortable and relaxing reclining positions. A further object is to provide means for converting the device into a cot or bed which will support the human body in the conventional horizontal position or in a somewhat inclined position, if desired. Another object is to provide a device which, when not in use, may be so completely collapsed that it may be conveniently transported by the person using the device.

A preferred form of the invention is illustrated in the accompanying drawing, of which:

Figure 1:
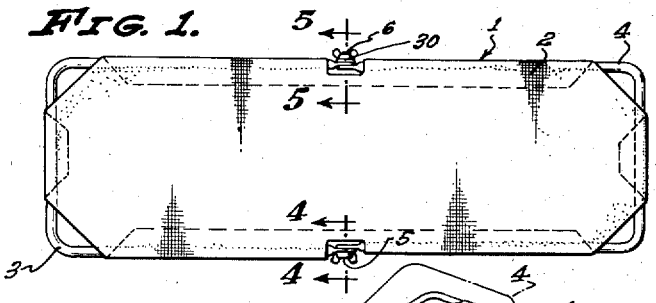
Figure 1 is a plan view of the device as it appears when adjusted to form a cot.

The device of the invention, in the form illustrated in the drawing, includes a rectangular main frame 1 to which a flexible body supporting member 2 is securely affixed. The frame consists of two U-shaped sections 3, 4 which are pivotally interconnected by means of studs or bolts 5, 6. This frame is mounted on two U-shaped supporting brackets 10, 11, the upper ends of which are pivotally joined to studs downwardly projecting from the frame members intermediate the ends thereof, substantially as indicated at 12, 13 and 14, 15. When so constructed, it is found that the two sections of the frame may be swung considerable distances on their pivots both inwardly and outwardly. The two frame members and the supporting brackets are all made from steel rods or tubes of sufficient strength to support a heavy human body and the supporting brackets must be resilient enough to adjust themselves to the positions taken by the frame during bodily exercises such as illustrated in the various views of the drawings.

Figure 2:
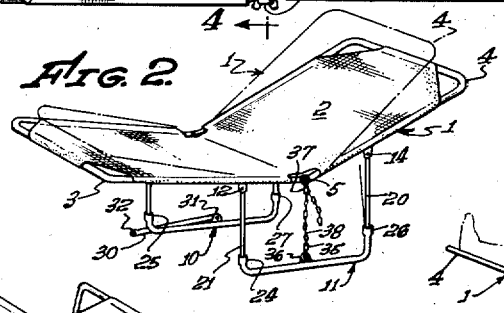
Fig. 2 shows, in perspective, the device adjusted for reclining or exercising purposes.

When the device is used as a chair, as indicated in Fig. 2, it is found that the resilience of the supporting brackets will permit the weight of the occupant's body to swing the frame members inwardly on their pivots into the most relaxing reclining posture, substantially as indicated in phantom outline.

Figure 3:
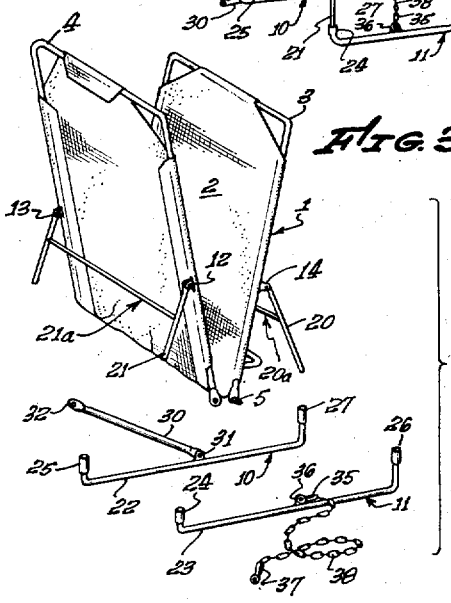
Fig. 3 is a composite view of the various parts of the device as they appear before completely assembled.

Referring now to Fig. 3, it is noticed that the supporting brackets 10, 11 consist of upper frame portions 20, 21, supported on the pivots 12 to 14, and base members 22, 23. The ends of these base members are bent upwardly to form legs which at the upper ends thereof are fitted with socket elements 24 to 27 into which the ends of the upper frame portions may be pressed to assemble the supporting brackets 10, 11. And it is important to note that the legs of the frame portion 20 are longer than the legs of frame portion 21; also that the upstanding portions of the base members are longer at one end of the members than at the other, all for the purposes which will now be explained. But the cross braces 20a, 21a of the upper frame portions may, as indicated in other views of the drawing, be omitted.

Figure 6:
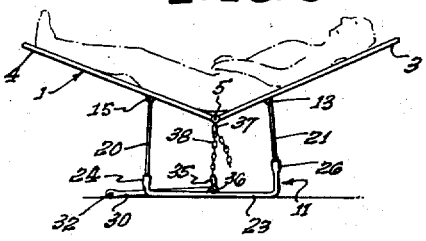
Figs. 6 to 10 illustrate various manners in which the component parts of the device may be assembled as best suited for relaxing and exercising purposes.
Figure 7:
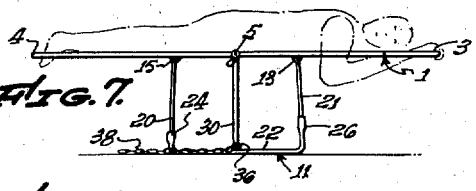

As shown in Fig. 2, the longer legs of the frame portion 20 are seated in the higher socket elements 26, 27 of the base frames and the shorter legs of frame portion 21 in the lower sockets 24, 25. When so placed, it is found that the device can be set to assume the most comfortable sitting position. However, the main frame 1 may be turned end for end, as indicated in Fig. 6, should this position of adjustment be found more comfortable. It is important to note that in the latter position of adjustment, the pivotal joints 12 to 14 are all the same distance above the base frames 22, 23. When so assembled, it is found that the main frame 1 may be swung into the horizontal position indicated in Fig. 7 to serve as a cot on which the occupant may rest comfortably. But because the frame sections 3, 4 are free to swing on the studs or bolts 5, 6, it becomes necessary to lock the frame sections in this position. While this may be done by tightening the nuts of these studs or bolts, it is considered safer to provide means more securely to interlock the sections. I have to this end in Figs. 3 and 7 shown a bar 30 pivotally secured to a lug 31 rising from the middle of the base member 22. The outer end of this bar is at 32 shown perforated to engage the stud or bolt 6 rigidly to interlock the frame sections in horizontal position. Should a slightly inclined surface be preferred, it is merely required to unhook the bar 30 from the stud and to turn the main frame 1 end for end; then to reseat the sub-frame legs in the sockets at the opposite ends of the hose members.

Figure 4:
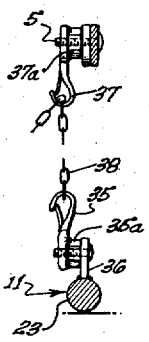
Figs. 4 and 5 illustrate novel connecting and movement limiting elements of the invention.
Figure 5:
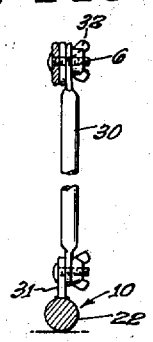
Figure 8:
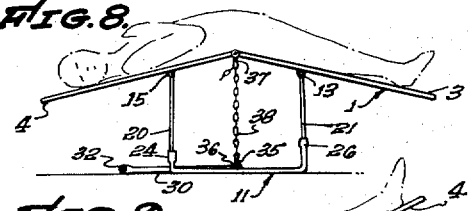
Figure 9:
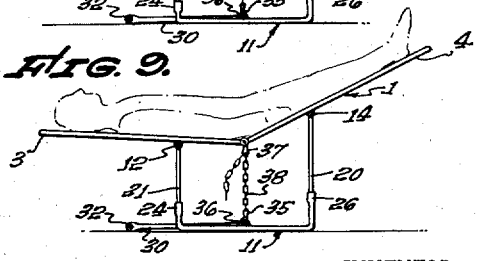
Figure 10:
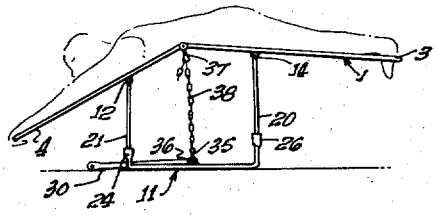

It was above pointed out that the device of the invention is ideal for exercising purposes and it should be clear from the foregoing description that the frame may be adjusted as best suited for any particular form of exercise whether the frame is turned one way, as indicated in Figs. 6 to 8 or reversed on the base members as shown in Figs. 9 and 10. The resilience of the support brackets 10, 11 will permit the frame sections to yield on their pivots to any position the human body is capable of assuming. But it is important to note that, while the brackets will yield readily to slight body movements, it should be clear that the resistance to such movement so rapidly increases that the user must apply more and more physical force gradually to increase the bodily movements as required for exercising purposes. The brackets do for this reason not only effectively check uncontrolled swinging movements of the frame but also, and equally important, serve to impel return movement of the frame and the body resting thereon. This is of great comfort to the patient endeavoring to overcome a painful weakness. He may flex his body as far as the painful condition will allow but is not required to exert additional painful effort to return the body to normal position, the brackets do the work. It may, however, often be found necessary to limit outward swinging movement of the frame sections in order to eliminate all danger of injury to the body should the occupant attempt to start a too violent body readjustment. This may be done by mounting a spring clip 35 on a lug 36 rising from the middle of the other base member 23 and by attaching a similar spring clip 37 to the frame stud 5, as best shown in Fig. 4. A chain 38 is attached to the two clips and since any links of this chain may be mounted in the clips, it is seen that the length of the chain may be adjusted to limit outward swinging movement of the frame sections to any desired extent.

I claim:

[1. In combination, a body supporting frame consisting of two sections pivotally interconnected at the center of the frame, studs downwardly projecting from the side edges of the two sections intermediate the ends thereof, and two U-shaped supporting brackets, each bracket including a base member and legs rising from the ends thereof, the upper ends of the legs of each bracket being pivotally mounted on the studs at one side edge of the frame, the two frame sections having freedom of relative swinging movement on their pivotal interconnection and on the pivotal connection with the upper ends of the legs.]

2. In combination, a body supporting frame consisting of two sections pivotally interconnected at the center of the frame, studs downwardly projecting from the side edges of the two sections intermediate the ends thereof, two U-shaped supporting brackets, each bracket including a base member and legs rising from the ends thereof, the upper ends of the legs of each bracket being pivotally mounted on the studs at one side of the frame, the two frame sections having freedom of relative swinging movement on their pivotal interconnection and on the pivotal connections with the upper ends of the legs, and means for limiting the swinging movement of the frame sections.

3. In combination, a body supporting frame consisting of two sections pivotally interconnected at the center of the frame, studs downwardly projecting from the side edges of the two sections intermediate the ends thereof, two U-shaped supporting brackets, each bracket including a base member and legs rising from the ends thereof, the upper ends of the legs of each bracket being pivotally mounted on the studs at one side edge of the frame, the two frame sections having freedom of relative swinging movement on their pivotal interconnection and on the pivotal connections with the upper ends of the legs, and means for interlocking the frame with brackets to prevent relative swinging movement of the frame sections.

4. In combination, a body supporting frame consisting of two sections pivotally interconnected at the center of the frame, studs downwardly projecting from the side edges of the two sections intermediate the ends thereof, a frame support, said support including a pair of legs pivotally mounted on the studs of each frame section, and two base members having legs rising from the ends thereof, the legs of each base member having sockets in the upper ends thereof for receiving the ends of the legs extending from the frame studs at one side edge of the frame.

5. In combination, a body supporting frame consisting of two sections pivotally interconnected at the center of the frame, studs downwardly projecting from the side edges of the two sections intermediate the ends thereof, a frame support, said support including a pair of legs pivotally mounted on the studs of each frame section, and two base members having legs rising from the ends thereof, the legs of each base member having sockets in the upper ends thereof for receiving the ends of the legs extending from the frame studs at one side edge of the frame, one pair of frame legs being longer than the other, the legs at one end of the base members being longer than the legs at the other end thereof.

6. In combination, a body supporting frame consisting of two sections, pivots interconnecting the two sections at the middle of the frame for relative swinging movement, studs downwardly projecting from the side edges of the two sections intermediate their ends, a spring clip mounted on one of said pivots, two U-shaped brackets, each bracket including a base member parallel with the frame side edges and legs rising from the ends of the member, lugs rising from the middle of each base member, a spring clip on the base member lug directly below the spring clip on the pivot, and a chain, links of the chain being mountable in the spring clips to limit relative swinging movement of the two frame sections.

7. In combination, a body supporting frame consisting of two sections pivotally inconnected at the center thereof, studs downwardly projecting from the side edges of the two sections intermediate the ends thereof, two supporting brackets transversely mounted to swing on said studs, said brackets having legs downwardly extending therefrom, two base members positioned in alinement with the frame side edges, said members having legs rising from the ends thereof and lugs rising from the middle thereof, the legs having sockets at the upper ends thereof for receiving the ends of the bracket legs, the legs of one bracket extending downward further than the legs of the other, one leg of each base member being longer than the other, and a bar extendible from one of said lugs to the pivotal frame connection about the lug to lock the frame sections against relative swinging movement.

*8. In combination, a body supporting frame consisting of two sections pivotally interconnected at the center of the frame, two U-shaped supporting brackets, each bracket including a base member and legs rising from the ends thereof, the upper ends of the legs of each bracket being pivotally attached at one side of the frame at a point intermediate the ends of each respective section, the two frame sections having freedom of relative swinging movement on their interconnection and on the pivotal connections of the ends of the upper legs, and means for limiting the swinging movement of the frame sections.*

*9. In combination, a body supporting frame consisting of two sections pivotally interconnected at the center of the frame, two U-shaped supporting brackets, each bracket including a base member and legs rising from the ends thereof, the upper ends of the legs of each bracket being pivotally attached to the frame at intermediate points of the sides of said sections, the two frame sections having freedom of relative swinging movement on their pivotal interconnection and on the pivotal connections with the upper ends of the legs, and means for interlocking the frame with the brackets to prevent relative swinging movement of the frame sections.*

*10. A body supporting frame according to claim 9 wherein the interlocking means comprises a rigid bar detachably secured between said frame and said brackets, whereby the frame may be rigidly interlocked in horizontal position.*

*11. In combination, a body supporting frame consisting of two sections pivotally interconnected at the center of the frame, pivot members at the side edges of the two sections intermediate the ends thereof, a frame support, said support including a pair of legs pivotally mounted on the pivot members of each frame section, and two base members having legs rising from the legs thereof, the legs of each base member having sockets in the upper ends thereof for receiving the ends of the legs extending from the frame pivot members at one side edge of the frame.*

References Cited in the file of this patent or the original patent

UNITED STATES PATENTS

| | | |
|---|---|---|
| 1,271,701 | Griffith | July 9, 1918 |
| 1,457,232 | Sheney | May 29, 1923 |
| 1,586,355 | De Franco | May 25, 1926 |
| 2,542,744 | Willens et al. | Feb. 20, 1951 |
| 2,631,303 | Valentine | Mar. 17, 1953 |

FOREIGN PATENTS

| | | |
|---|---|---|
| 622,588 | Great Britain | May 4, 1949 |